United States Patent
Puente

(10) Patent No.: US 10,518,696 B2
(45) Date of Patent: Dec. 31, 2019

(54) LIGHT DEVICE FOR A MOTOR VEHICLE

(71) Applicant: VALEO VISION, Bobigny (FR)

(72) Inventor: Jean-Claude Puente, Bobigny (FR)

(73) Assignee: VALEO VISION, Bobigny (FR)

( * ) Notice: Subject to any disclaimer, the term of this patent is extended or adjusted under 35 U.S.C. 154(b) by 170 days.

(21) Appl. No.: 15/715,931

(22) Filed: Sep. 26, 2017

(65) Prior Publication Data

US 2018/0086250 A1    Mar. 29, 2018

(30) Foreign Application Priority Data

Sep. 26, 2016 (FR) ...................................... 16 59045

(51) Int. Cl.
| | | |
|---|---|---|
| *B60Q 1/04* | (2006.01) |
| *B60Q 1/06* | (2006.01) |
| *F21V 21/30* | (2006.01) |
| *F21V 19/00* | (2006.01) |

(52) U.S. Cl.
CPC ......... *B60Q 1/0425* (2013.01); *B60Q 1/0491* (2013.01); *B60Q 1/06* (2013.01); *F21V 19/00* (2013.01); *F21V 21/30* (2013.01)

(58) Field of Classification Search
CPC ...... B60Q 1/04; B60Q 1/0683; B60Q 1/0425; B60Q 1/0491; F21V 21/30; F21V 19/00
See application file for complete search history.

(56) References Cited

U.S. PATENT DOCUMENTS 4,345,307 A    8/1982   Mayer et al.
4,356,539 A    10/1982  Shanks
5,010,456 A *  4/1991   Reichman ............ B60Q 1/0433
                                                  362/418
2014/0268843 A1  9/2014   Ruprecht et al.

FOREIGN PATENT DOCUMENTS

GB         1 246 972         9/1971
WO     WO 2013/123537 A1     8/2013

OTHER PUBLICATIONS

French Preliminary Search Report dated Jun. 7, 2017 in French Application 16 59045, filed on Sep. 26, 2016 (with English Translation of Categories of cited documents).

* cited by examiner

*Primary Examiner* — Karabi Guharay
(74) *Attorney, Agent, or Firm* — Oblon, McClelland, Maier & Neustadt, L.L.P.

(57) ABSTRACT

Light device for a motor vehicle comprising:
  a support;
  at least one light module, said light module being mounted to pivot about at least one axis on the support by means of at least one pivot link between the light module and the support, said pivot link comprising an elastically deformable element arranged to allow a pivoting of the light module in relation to the support about said axis;
  at least one setting means for the light module arranged to allow a pivoting of the light module in relation to the support about said axis when the setting means is actuated;
  a constraint means arranged to hold the light module in position in relation to the support in the absence of actuation of the setting means.

20 Claims, 6 Drawing Sheets

LIGHT DEVICE FOR A MOTOR VEHICLE

TECHNICAL FIELD OF THE INVENTION

The present invention relates to a light device for a motor vehicle.

It is applicable in particular but in a nonlimiting manner in the lighting and/or signaling devices, such as motor vehicle headlights.

TECHNOLOGICAL BACKGROUND OF THE INVENTION

A light device for a motor vehicle comprises, as is known to a person skilled in the art, a support and at least one light module.

To set the positioning of the light module on the support, plastic capsules fixed to said light module are used. Each capsule cooperates with a spherical headed screw force-fitted into said capsule. The light module thus comprises a fixed point (ball joint link) and two screws for forcing a rotation of said light module in a vertical direction and in a horizontal direction. That makes it possible to set a light beam produced by said light module.

One drawback with this prior art is linked to the change in size of the light modules. In effect, when the light device comprises a plurality of light modules, these light modules are smaller and the screws and the capsules are then almost as big as the light modules themselves and therefore can no longer be used. Moreover, the capsule risks breaking if its size is reduced.

In this context, the present invention aims to resolve the abovementioned drawback.

GENERAL DESCRIPTION OF THE INVENTION

To this end, the invention proposes a light device for a motor vehicle, said light device for a motor vehicle comprising:
- a support;
- at least one light module, said light module being mounted to pivot about at least one axis on the support by means of at least one pivot link between the light module and the support, said pivot link comprising an elastically deformable element arranged to allow a pivoting of the light module in relation to the support about said axis;
- at least one setting means for the light module arranged to allow a pivoting of the light module in relation to the support about said axis when the setting means is actuated;
- a constraint means arranged to hold the light module in position in relation to the support in the absence of actuation of the setting means.

Thus, as will be seen in detail herein below, no capsule is now used. Moreover, the elastically deformable element simplifies the positioning of the light device at the pivot link level. Once the position of the light device is set, the constraint means makes it possible to hold the light module in this position. The constraint means is adapted to absorb the vibrations at the pivot link level and prevents the latter from breaking.

According to nonlimiting embodiments, the light module can further comprise one or more additional features out of the following:

According to a nonlimiting embodiment, the pivot link further comprises a threaded rod and a locking nut.

According to a nonlimiting embodiment, the threaded rod and/or the locking nut is made of steel or of glass fiber-reinforced plastic.

According to a nonlimiting embodiment, the elastically deformable element is adapted to absorb the angular variations of the light module during the setting of the position of said light module by the setting means.

According to a nonlimiting embodiment, the elastically deformable element is made of rubber.

According to a nonlimiting embodiment, said light device comprises a setting means for a vertical setting of the light module and a setting means for a horizontal setting of said light module.

According to a nonlimiting embodiment, the constraint means is independent of the setting means.

According to a nonlimiting embodiment, the setting means comprises a contact end with the support, said contact end having no sharp edge.

According to a nonlimiting embodiment, the constraint means is a spring, notably a spring leaf.

According to a nonlimiting embodiment, the constraint means is incorporated in the setting means.

According to a nonlimiting embodiment, the constraint means is a spring.

According to a nonlimiting embodiment, the setting means is secured to the support.

According to a nonlimiting embodiment, the setting means comprises a threaded rod and a screw pitch.

According to a nonlimiting embodiment, the setting means is secured to the light module.

According to a nonlimiting embodiment, the setting means comprises a threaded rod and a nut.

According to a nonlimiting embodiment, said light device comprises a light module, called reference module, said reference module being mounted on the support by means of three pivot links, said at least one pivotingly mounted light module being set on the support in relation to said reference module.

According to a nonlimiting embodiment, said light device comprises a plurality of light modules and is adapted to produce a segmented light beam made up of several light segments, that can be activated selectively, one light segment being generated by one light module.

BRIEF DESCRIPTION OF THE FIGURES

The invention and its various applications will be better understood on reading the following description and on studying the accompanying figures.

DESCRIPTION OF EMBODIMENTS OF THE INVENTION

The elements that are identical, by structure or by function, appearing in the different figures retain, unless stipulated otherwise, the same references.

The light device 10 for a motor vehicle according to the invention is described with reference to FIGS. 1 to 10.

A motor vehicle should be understood to mean any type of motorized vehicle.

In a nonlimiting embodiment taken herein below in the description, the light device 10 is a lighting and/or signaling device. In a nonlimiting variant embodiment, the lighting and/or signaling device is a motor vehicle headlight.

Figure 1:
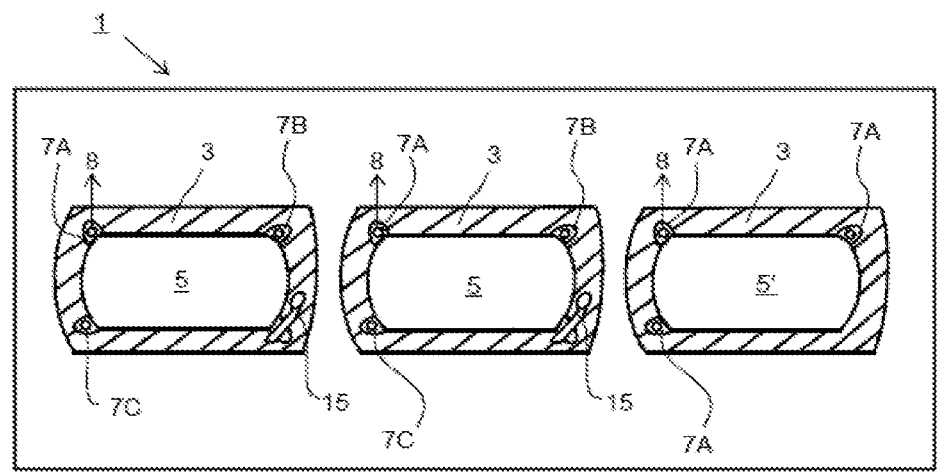
FIG. 1 schematically represents a light device according to a first nonlimiting embodiment of the invention, comprising a support and a plurality of light modules fixed to this support.
Figure 5:
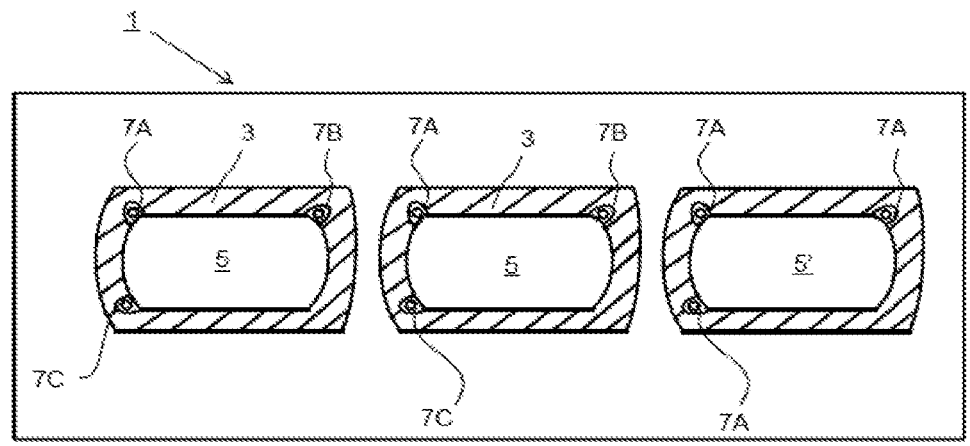
FIG. 5 schematically represents a light device according to a second nonlimiting embodiment of the invention, comprising a support and a plurality of light modules fixed to this support.

As illustrated in FIGS. 1 and 5, the light device 10 comprises
- a support 3;
- at least one light module 5;
- at least one pivot link 7A adapted to mount the light module 5 on the support 3 so as to pivot;
- at least one setting means 7B, 7C; and
- a constraint means 15.

The pivot link 7A allows the light module 5 to perform a rotation in the vertical Y and horizontal Z directions.

Said at least one setting means 7B, 7C allows the pivoting of the light module 5 in relation to the support 3 about an axis 8 when said at least one setting means 7B, 7C is actuated.

In a nonlimiting embodiment, the light device 1 comprises two setting means 7B and 7C. The setting means 7B and the setting means 7C respectively allow a horizontal setting and a vertical setting of the light module 5 in relation to the support 3.

The constraint means 15 makes it possible to hold the light module 5 in position in relation to the support 3, once the horizontal setting and the vertical setting of the light module 5 have been carried out. This holding is applied in the absence of actuation of the setting means 7B, 7C.

In a nonlimiting embodiment, the light device 10 comprises a plurality of light modules 5 adapted to be mounted on a support 3, each via a pivot link 7A and at least one setting means 7B, 7C.

In the nonlimiting example illustrated in FIGS. 1 and 5, the light device 10 comprises three light modules 5 adapted to be mounted on a support 3, each via a pivot link 7A and two setting means 7B, 7C.

In a nonlimiting embodiment illustrated in FIGS. 1 and 5, the light device 10 further comprises a light module 5' adapted to serve as reference module for the positioning of the other light modules 5 in the light device 10. In this case, the reference light module comprises three pivot links 7A which are set in the same way (at the same level). These three pivot links thus form three fixed points. This reference module 5' is positioned on the axis of the road as a function of the determined photometric function.

Thus, the light segment 22 produced by this reference light module 5' serves as reference light segment for the setting of the other light segments 22 (illustrated in FIG. 3, 7 or 8) of the other light modules 5. The other light segments 22 can thus be set vertically and horizontally so as to be aligned on the reference light segment and so as to create a segmented light beam made up of several light segments 22, that can be activated selectively.

By virtue of the pivot link 7A and the setting means 7B, 7C, each light module 5 can be set in relation to the reference module 5' independently of the other light modules 5.

The light device 1 is illustrated according to a first nonlimiting embodiment illustrated in FIGS. 1 to 4 and according to a second nonlimiting embodiment illustrated in FIGS. 5 to 8.

Figure 9:
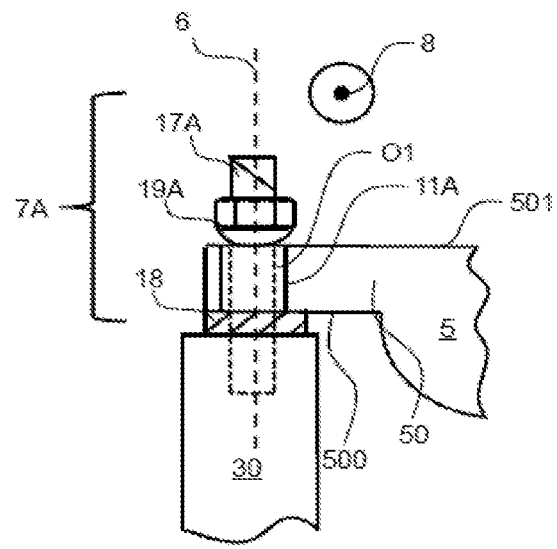
FIG. 9 schematically represents the pivot link of the light device of FIGS. 2 and 6, when the light module is in a first position.
Figure 10:
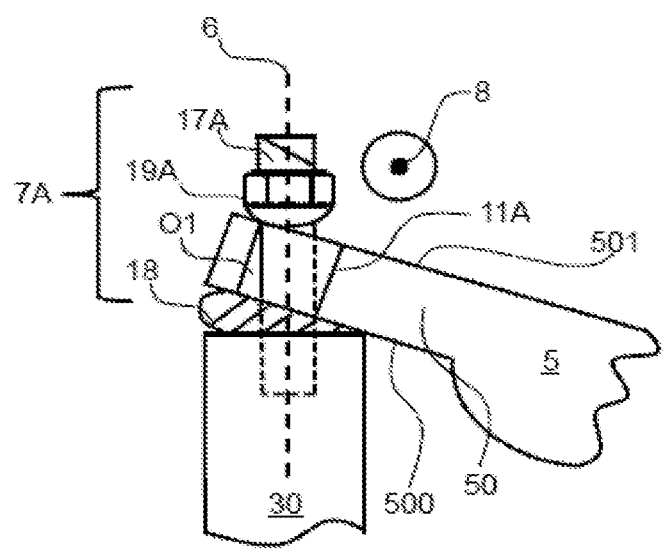
FIG. 10 schematically represents the pivot link of the light device of FIGS. 2 and 6, when the light module is in a second position.

The pivot link 7A illustrated in FIGS. 9 and 10 applies to both of these nonlimiting embodiments.

Figure 2:
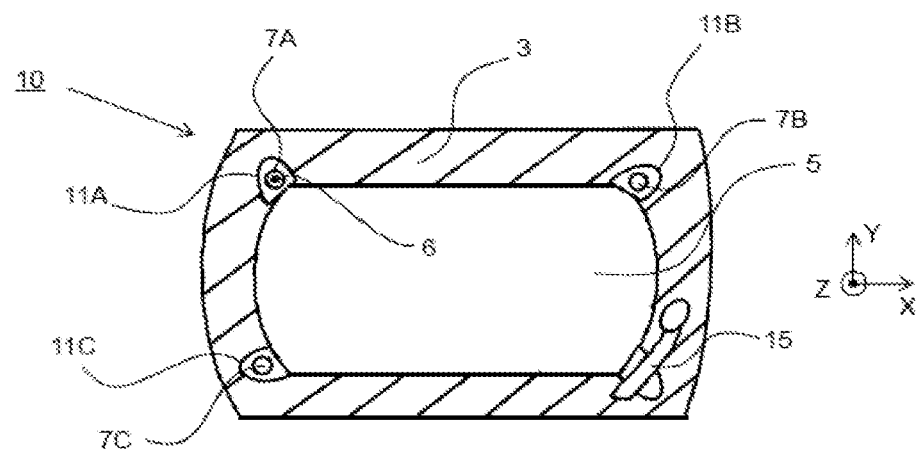
FIG. 2 schematically represents a mounting of one of the light modules of the light device of FIG. 1 on the support according to a first nonlimiting embodiment, said light module being fixed by a pivot link and two setting means, said light module being held in position by a constraint means distinct from the pivot link and from the setting means.
Figure 3:
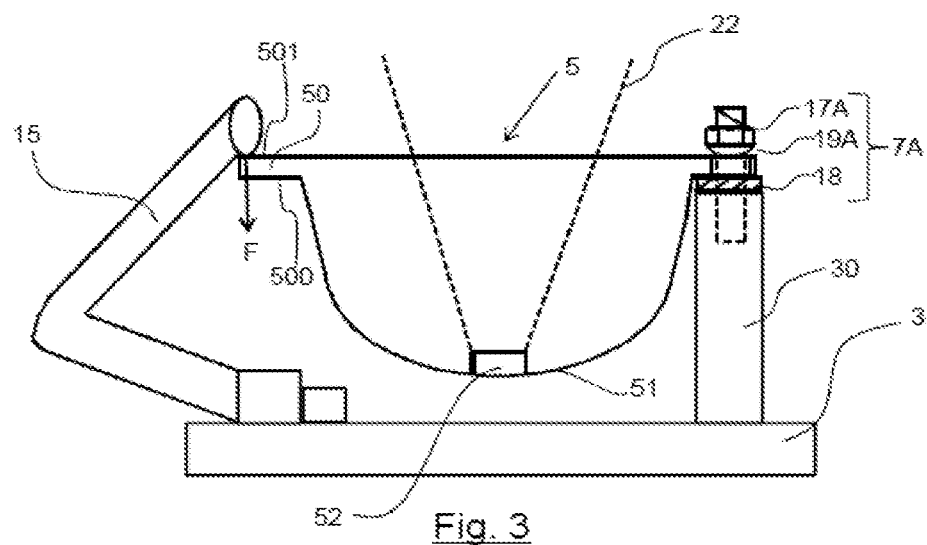
FIG. 3 schematically represents a cross-sectional view of the light module of the device of FIG. 2, in which said light module is held by the constraint means.
Figure 4:
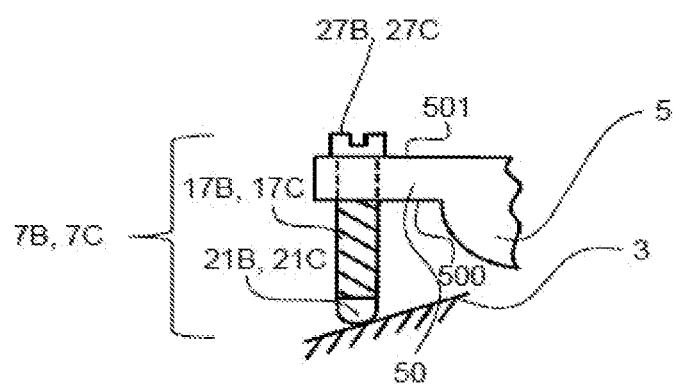
FIG. 4 schematically represents one of the setting means of the light module of FIGS. 2 and 3.

According to the first nonlimiting embodiment of the light device 1:
- the light module(s) 5 comprises (comprise) a constraint means 15 illustrated in FIGS. 2 and 3 which is distinct from said at least one setting means 7B, 7C, that is to say that it is not incorporated in said at least one setting means 7B, 7C;
- the light module(s) 5 comprises (comprise) two setting means 7B, 7C according to a first nonlimiting embodiment illustrated in FIG. 4.

Figure 7:
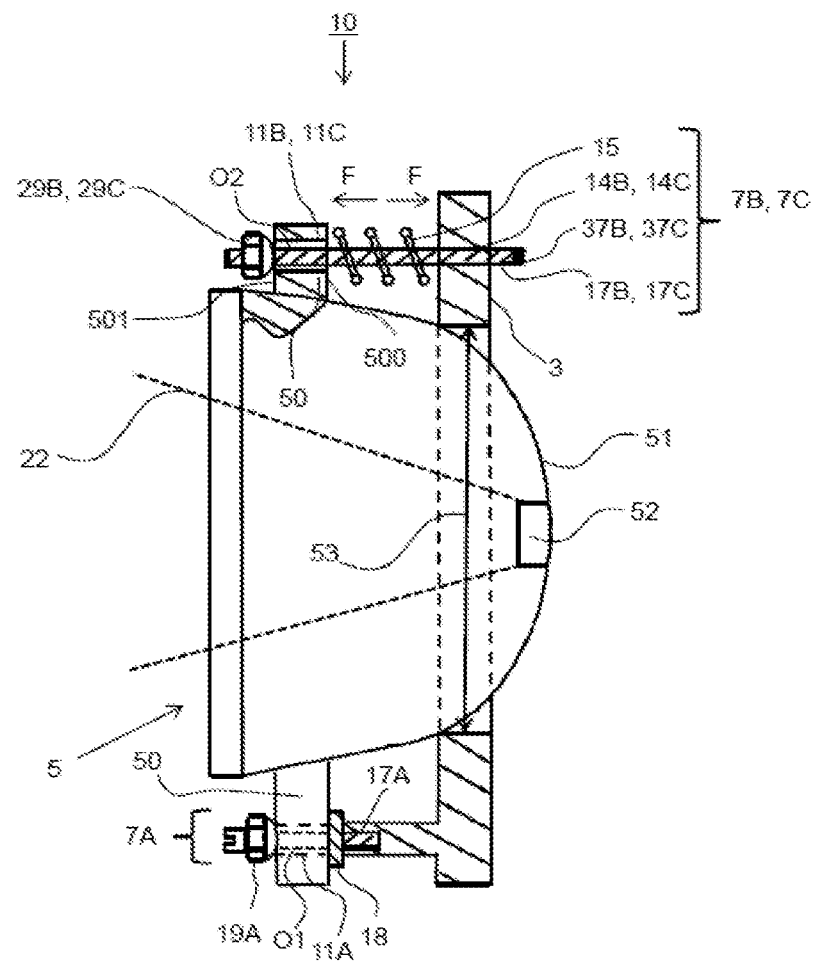
FIG. 7 schematically represents a cross-sectional view of the light module of the device of FIG. 6, in which said light module is held by the constraint means acting in compression mode, said constraint means being incorporated in the setting means according to a first nonlimiting variant embodiment.
Figure 8:
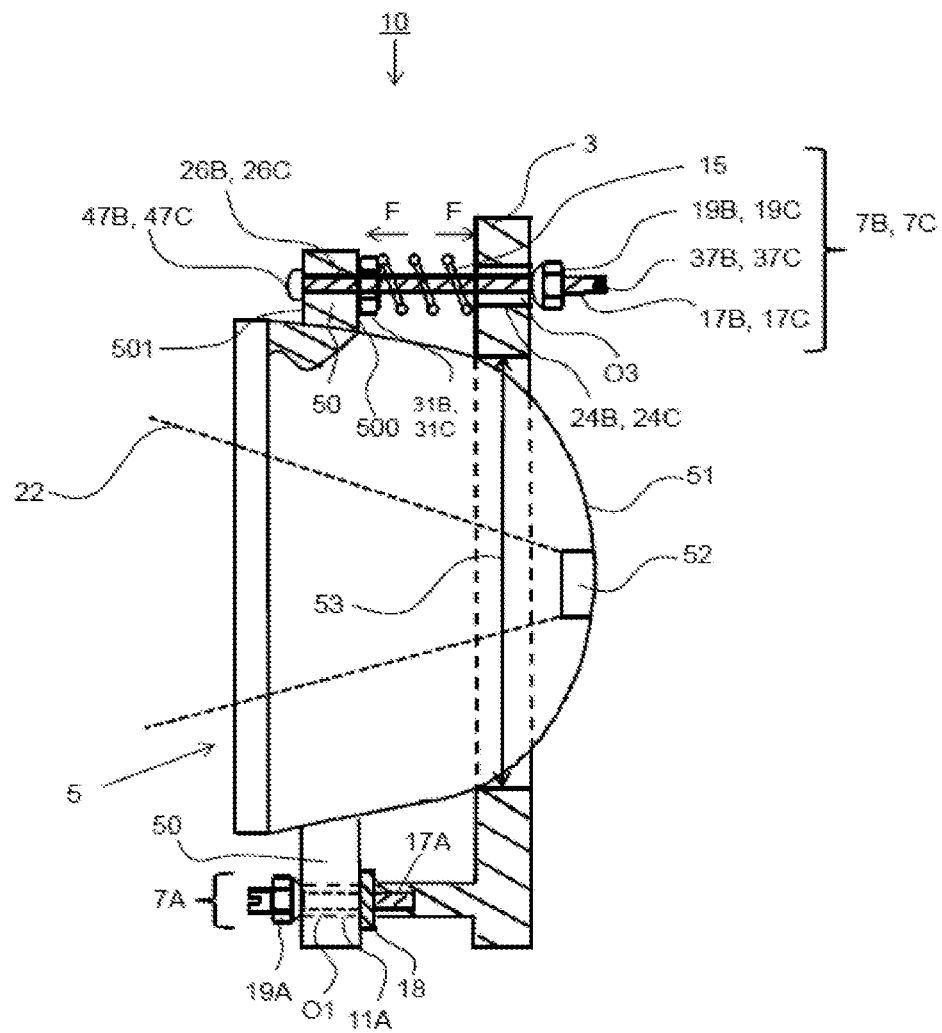
FIG. 8 schematically represents a cross-sectional view of the light module of the device of FIG. 6, in which said light module is held by the constraint means acting in compression mode, said constraint means being incorporated in the setting means according to a second nonlimiting variant embodiment.

According to the second nonlimiting embodiment of the light device 1:
- the light module(s) 5 comprises (comprise) a constraint means 15 which forms part of said at least one setting means 7B, 7C,
- the light module(s) 5 comprises (comprise) two setting means 7B, 7C:
  - according to a first nonlimiting variant illustrated in FIG. 7 in which the setting means 7B, 7C are secured to the support 3; or
  - according to a second nonlimiting variant illustrated in FIG. 8 in which the setting means 7B, 7C are secured to the light module 5.

The various elements of the light device 10 are described in detail herein below according to the different nonlimiting embodiments.

Light Module

As illustrated in FIGS. 3, 8 and 9, a light module 5 comprises:
- a base 50 adapted to allow the fixing of the light module 5 to the support 3;
- an optical means 51;

a light source 52 comprising light emission means (not illustrated) and adapted to emit light rays forming a light segment 22.

Figure 6:
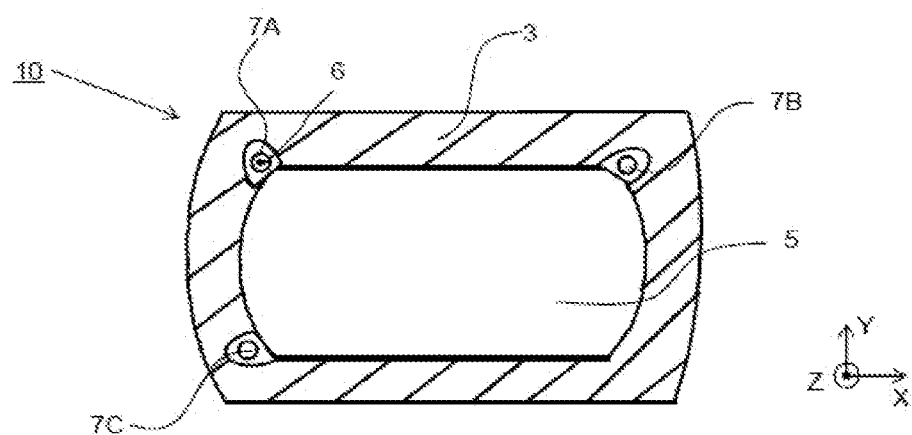
FIG. 6 schematically represents a mounting of one of the light modules of the light device of FIG. 6 on the support according to a second nonlimiting embodiment, said light module being fixed by a pivot link and two setting means, said light module being held in position by a constraint means incorporated in one of the setting means.

When the light device 10 comprises a plurality of light modules 5 as illustrated in FIG. 1 or FIG. 6, said light modules 5 form a matrix. The set of the light segments 22 of the different light modules 5 then forms a segmented light beam also called matrix light beam. The light segments 22 can be activated selectively, in other words they can be generated independently of one another.

In a nonlimiting example, the segmented light beam of the light device 10 is adapted to ensure a so-called "high beam" photometric function to produce a high beam. In another nonlimiting example, the segmented light beam of the light device 10 is adapted to ensure a so-called "low beam" photometric function to produce, for example, a low beam.

In a nonlimiting embodiment, the optical means 51 is:
a reflector; and/or
a lens.

The optical means 51 cooperates with the light source 52 described herein below to form the light segment 22.

In the nonlimiting example illustrated in FIGS. 3, 8 and 9, the optical means 51 is a reflector secured to the base 50 of the light module 5.

In a nonlimiting embodiment illustrated in FIGS. 8 and 9, the support 3 of the light device 10 comprises an aperture 53 through which the light segment 22 passes.

In addition to the light emission means, the light source 52 comprises an electrical connection interface (not illustrated). The electrical connection interface is adapted for the electrical power supply and for driving the light emission means. The electrical connection interface is adapted to cooperate with an external electrical connector which makes it possible to send driver commands to the light source 52 and to power it.

In a nonlimiting embodiment, the light emission means comprise at least one semiconductive emitting chip.

In a nonlimiting variant embodiment, a semiconductive emitting chip forms part of a light-emitting diode. A light-emitting diode should be understood to be any type of light-emitting diodes, whether they be, in nonlimiting examples, LEDs (Light-Emitting Diodes), an OLED (Organic LED) or an AMOLED (Active-Matrix Organic LED), or even a FOLED (Flexible OLED). As a variant, the light emission means can comprise a laser source associated with a wavelength conversion element, such as a photoluminescent material.

Support of the Light Device

In a nonlimiting embodiment, the support 3 of the light device 10 is a housing of the light device 10.

In another nonlimiting embodiment, the support 3 of the light device 10 is an intermediate plate onto which the light module(s) 5 is (are) fixed.

In FIGS. 1 to 12, in a nonlimiting embodiment, each light module 5 is fixed to the support 3 by:
a pivot link 7A;
two setting means 7B, 7C.

Pivot Link

The pivot link 7A allows the light module 5 to perform a rotation in the vertical Y and horizontal Z directions.

The pivot link is also called fixed point.

As illustrated in FIGS. 9 and 10, in a nonlimiting embodiment, the pivot link 7A comprises:
a threaded rod 17A;
a locking nut 19A; and
an elastically deformable element 18.

These various elements are described in detail herein below.

In a nonlimiting embodiment, the threaded rod 17A is made of steel or of glass fiber-reinforced plastic. This material is inexpensive.

The threaded rod 17A is secured to a boss 30 of the support 3. The threaded rod 17A is adapted to be inserted into the base 50 and thus makes it possible to link the light module 5 to the support 3.

In a nonlimiting embodiment, the boss 30 of the support 3 is of cylindrical form.

The base 50 comprises a through orifice 11A for the threaded rod 17A. This orifice 11A has a width greater than the threaded rod 17A such that there is a play O1 between the threaded rod 17A and the walls of said orifice 11A.

The threaded rod 17A and the boss 30 extend along an axis 6.

In a nonlimiting embodiment, the orifice 11A has a diameter less than five millimeters.

The locking nut 19A makes it possible to lock the light module 5 onto the support 3. This locking nut 19A is adapted to be screwed onto the threaded rod 17A. For that, it comprises a screw pitch complementing the threading of the threaded rod 17A. The tightening of the locking nut 19A is performed such that this locking nut:
does not block the rotation of the light module 5 about an axis 8 called axis of rotation. This axis of rotation 8 is at right angles to the axis 6. The light module 5 can thus pivot about this axis of rotation 8 during its setting by the setting means 7B, 7C (described later);
is in contact with the base 50, in particular with its top face 501.

Thus, the locking nut 19A is not screwed right down onto the threaded rod 17A such that it is possible to rotate the light module 5 about the axis of rotation 8.

In a nonlimiting embodiment, the locking nut 19A is made of steel or of glass fiber-reinforced plastic.

The elastically deformable element 18 is disposed between the base 50 of the light module 5 and the boss 30 of the support 3. In particular, the elastically deformable element 18 is in contact with the bottom face 500 of the base 50.

In FIG. 9, the elastically deformable element 18 is crushed uniformly by the light module 5. The module 5 is in a first position in which, for example, the light segment 22 of the light module 5 is not yet set in relation to the light segment 22 of the reference module 5' so as to obtain the desired matrix light beam.

In FIG. 10, the light module 5 has been set in a second position different from the first position. It has pivoted about the axis of rotation 8. The crushing of the elastically deformable element 18 is then no longer uniform. A part of the elastically deformable element 18 is almost totally crushed. Thus, the elastically deformable element 18 is wholly or partly compressed so as to accompany and allow the pivoting of the light module 5 about the axis of rotation 8.

The elastically deformable element 18 is thus adapted to absorb the angular variations of the light module 5 during the setting of the position of this light module 5 by one or more setting means 7B, 7C.

In a nonlimiting embodiment, the elastically deformable element 18 is made of rubber.

Note that the play O1 which exists between the threaded rod 17A and the walls of the orifice 11A makes it possible to not block the pivoting of the light module 5.

It will be noted that, in the case of a light module which serves as reference module 5', said light module comprises pivot links 7A which do not comprise any elastically deformable element 18. In effect, in this case, the reference module does not pivot about the axis 8 because it is fixedly mounted on the support 3.

Setting Means

In a nonlimiting embodiment, the light module 5 comprises two setting means 7B, 7C.

The setting means 7B is adapted to horizontally block the light module 5, that is to say block said light module 5 in a direction Z, called horizontal or lateral direction as illustrated in FIGS. 2 and 6.

The setting means 7C is adapted to vertically block the light module 5, that is to say block said light module 5 in a direction Y, called vertical direction as illustrated in FIGS. 2 and 6.

The setting means 7B, 7C are described herein below according to two nonlimiting embodiments (7B, 7C).

First Embodiment

FIG. 4 illustrates a first nonlimiting embodiment of the setting means 7B, 7C. In this embodiment, the setting means 7B, 7C are a threaded rod.

The threaded rod 7B, 7C comprises:
a threading 17B, 17C;
a rod head 27B, 27C;
a contact end 21B, 21C.

The threading 17B, 17C is adapted to be screwed into the base 50 of the light module 5.

To this end, the base 50 comprises two screw pitches adapted to respectively receive the threading 17A and 17C.

The rod head 27B, 27C is adapted to be contact with the light module 5, and the contact end 21 B, 21C of the threaded rod is adapted to be in contact with the support 3, in particular to bear on said support 3. Depending on the degree of screwing of the threaded rod 7B, 7C into the base 50, the position of the light module 5 is set in relation to this support 3. In effect, during screwing, the rod head 27B, 27C pushes on the base 50 of the light module 5 (in particular on its top face 501) which is displaced respectively horizontally or vertically and pivoted about the axis of rotation 8 by virtue of the pivot link 7A.

In a nonlimiting embodiment, the contact end 21B, 21C has no sharp edge. That makes it possible to have a catch-free contact between the contact end 21B, 21C and the support 3. The existence of a stress point on the support 3 is thus avoided. The threaded rod 17B, 17C does not risk being blocked in the support 3 and thus does not risk being broken.

In this first embodiment illustrated in FIGS. 1 to 3, the setting means 7B, 7C do not comprise any constraint means 15. Thus, the constraint means 15 and the setting means 7B, 7C are distinct.

In the embodiment of the light device 1 of FIGS. 1 to 4, the constraint means 15 is disposed on a side of the support 3 opposite the pivot link 7.

In a nonlimiting embodiment, the constraint means 15 is a spring, notably a spring leaf. This spring leaf is in contact with the light module 5; it exerts a pressure force F on the light module 5, in particular on the top face 501 of its base 50 as illustrated in FIG. 3. The spring leaf 15 makes it possible to absorb the movements of the pivot link 7A. It thus prevents the pivot link 7A from vibrating or breaking.

Second Embodiment

FIGS. 5 to 8 illustrate a second embodiment of the setting means 7B, 7C. In this second embodiment, the constraint means 15 is incorporated in the setting means 7B, 7C.

In FIGS. 7 and 8, in a nonlimiting embodiment, the constraint means 15 is a spring disposed between the light module 5 and the support 3. This spring 15 acts in compression mode, that is to say that it exerts a force F on the light module 5 and on the support 3.

First Variant Embodiment of the Second Embodiment

FIG. 7 illustrates a first variant embodiment of the second embodiment. In this first variant, the setting means 7B, 7C is secured to the support 3.

The setting means 7B, 7C comprises a threaded rod 17B, 17C and a screw pitch 14B, 14C. The screw pitch 14B, 14C forms part of the support 3 and the threaded rod 17B, 17C is screwed into said screw pitch 14B, 14C so that it is secured to this support 3.

The threaded rod 17B, 17C comprises an end 37B, 37C adapted to cooperate with a screwdriver head.

The threaded rod 17B, 17C is blocked on the light module 5 by a locking nut 29B, 29C which is in contact with the base 50.

In a nonlimiting embodiment, the surface of the locking nut 29B, 29C which is in contact with the base 50 has no sharp edge. That makes it possible to absorb the angle variations when the light module 5 is set horizontally or vertically.

The mounting of the light module 5 on the support 3 via the setting means 7B, 7C and the pivot link 7A is performed as follows.

In a first step, the threaded rod 17B, 17C is screwed into the support 3. It cooperates with a screw pitch 14B, 14C of said support 3. The spring 15 is then disposed around the threaded rod 17B, 17C such that the axis of the spring 15 coincides with the axis of the threaded rod 17B, 17C. The elastically deformable element 18 is disposed around the threaded rod 17A of the pivot link 17A and rests on the boss 30 of the support 3.

In a second step, the threaded rod 17B, 17C is inserted into the orifice 11B, 11C of the base 50 of the light module 5. The spring 15 is thus sandwiched between the base 50 of the light module 5 and the support 3. It will be noted that, in a nonlimiting embodiment, the orifice 11 B, 110 has smooth walls. The diameter of this orifice 11 B, 11 C is greater than the diameter of the threaded rod 17B, 17C so as to leave a play O2 for the passage of the threaded rod 17B, 17C. The play O2 makes it possible to absorb the angle variations when the light module 5 is set horizontally or vertically.

At the same time, the threaded rod 17A of the pivot link 7A is inserted into the orifice 11A of the base 50 provided for this purpose.

In a third step, the locking nut 29B, 29C is screwed onto the threaded rod 17B, 17C to block said threaded rod on the base 50 and therefore on the light module 5. The locking nut 29B, 29C presses on the base 50 in particular on its top face 501. It will be noted that the base 50 of the light module 5 is blocked between the spring 15 and the nut 29B, 29C.

In a fourth step, the nut 19A is screwed onto the rod 17A of the pivot link 7A.

In a fifth step, in order to set the light module 5 respectively horizontally and vertically, the screwing of the threaded rod 17B, 17C is adjusted by means of its end 37B, 37C (via a screwdriver) which brings the light module 5 closer to the support 3. The light module 5 pivots in relation to the support 3 about the axis 8 seen previously. This convergence (which corresponds to the pivoting) compresses the spring 15 associated with each threaded rod 17B, 17C. The elastically deformable element 18 is also compressed by virtue of the pivoting of the light module 5. The play O1 makes it possible to absorb the angle variations when the light module 5 pivots.

When the threaded rod 17B, 17C is no longer moving (that is to say that it is no longer actuated), the spring 15 which is compressed presses on the support 3 and on the base 50 of the light module 5 such that it holds said light module 5 in position in relation to the support 3.

In addition, the spring 15 prevents the threaded rod 17B, 17C from unscrewing. Finally, the spring 15 makes it possible to absorb the variations which can occur on said threaded rod 17B, 17C, particularly when the motor vehicle is running.

Obviously, in another nonlimiting embodiment, the mounting can begin with the insertion of the threaded rod 17B, 17C into the orifice 11B, 11C of the base 50 of the light module 5.

Second Variant Embodiment of the Second Embodiment

FIG. 8 illustrates a second variant embodiment of the second embodiment. In this second variant, the setting means 7B, 7C is secured to the light module 5.

The setting means 7B, 7C comprises a threaded rod 17B, 17C and a nut 19B, 19C.

The nut 19B, 19C is adapted to be in contact with the support 3. It makes it possible to adjust the setting of the light module 5.

In a nonlimiting embodiment, the surface of the nut 19B, 19C has no sharp edge. That makes it possible to absorb the angle variations when the light module 5 is set horizontally or vertically.

The threaded rod 17B, 17C comprises:
a head 47B, 47C which is adapted to cooperate with the base 50 of the light module 5 and;
an end 37B, 37C which is adapted to pass through the support 3.

The threaded rod 17B, 17C is secured to the light module 5 via a locking nut 31B, 31C.

The mounting of the light module 5 on the support 3 via the setting means 7B, 7C and the pivot link 7A is performed as follows.

In a first step, the threaded rod 17B, 17C is screwed into the base 50 of the light module 5 such that its head 47B, 47C rests on the base 50, in particular its outer face 501. It cooperates with a screw pitch 26B, 26C of the base 50. Then, the locking nut 31 B, 31C is screwed onto the opposite face 500 of the base 50 to block said threaded rod on the base 50 and therefore on the light module 5. The spring 15 is then disposed around the threaded rod 17B, 17C such that the axis of the spring 15 coincides with the axis of the threaded rod 17B, 17C. The elastically deformable element 18 is disposed around the threaded rod 17A of the pivot link 7A and rests on the boss 30 of the support 3.

In a second step, the threaded rod 17B, 17C is introduced into an orifice 24B, 24C of the support 3. The diameter of this orifice is greater than the diameter of the threaded rod 17B, 17C in order to leave a play O3 for the passage of the threaded rod 17B, 17C. It will be noted that, in a nonlimiting embodiment, the orifice 24B, 24C has smooth walls.

The play O3 makes it possible to absorb the angle variations when the light module 5 is set horizontally or vertically.

It will be noted that the spring 15 is sandwiched between the support 3 and the base 50 (via the nut 31B, 31C) of the light module 5.

At the same time, the threaded rod 17A of the pivot link 7A is inserted into the orifice 11A of the base 50 provided for this purpose.

In a third step, the nut 19B, 19C is screwed onto the threaded rod 17B, 17C. This nut 19B, 19C presses on the support 3. It will be noted that the support 3 is blocked between the spring 15 and the nut 19B, 19C.

In a fourth step, the nut 19A is screwed onto the rod 17A of the pivot link 7A.

In a fifth step, in order to set the light module 5 respectively horizontally and vertically, the nut 19B, 19C is turned which brings the light module 5 closer to the support 3 and thus makes it possible to set it. The light module 5 pivots in relation to the support 3 about the axis 8 seen previously. This convergence (which corresponds to the pivoting) compresses the spring 15 associated with each threaded rod 17B, 17C. The elastically deformable element 18 is also compressed by virtue of the pivoting of the light module 5.

The play O1 makes it possible to absorb the angle variations when the light module 5 pivots. When the threaded rod 17B, 17C is no longer moving (that is to say it is no longer actuated), the spring 15 which is compressed presses on the support 3 and on the base 50 (via the nut 31B, 31C) of the light module 5 such that it holds said light module 5 in position in relation to the support 3.

Obviously, in another nonlimiting embodiment, the mounting can begin with the insertion of the threaded rod 17B, 17C into the orifice 24B, 24C of the support 3 of the light module 5.

Obviously, the description of the invention is not limited to the embodiments described above.

Thus, in another nonlimiting embodiment, the number of light modules 5 in the light device 10 is equal to two or more than 3.

Thus, in the case of the second variant embodiment of the second embodiment of the setting means 7B, 7C (FIG. 8), in a nonlimiting embodiment, the setting means 7B, 7C can also include a seal disposed between the nut 19B, 19C and the support 3.

Thus, in the case of the first variant embodiment of the second embodiment of the setting means 7B, 7C (FIG. 7), in a nonlimiting embodiment, the setting means 7B, 7C can also include a seal disposed between the locking nut 29B, 29C and the base 50.

Thus, the invention described notably offers the following advantages:
the setting of the position of the light modules in the light device is simple to perform;
it makes it possible to offer a setting solution which is suited to small light modules;
it makes it possible to absorb the vibrations which could occur when the motor vehicle is running;
it makes it possible to independently set different light modules of the light device.

The invention claimed is:
1. A light device for a motor vehicle comprising:
a support;
at least one light module, said light module being mounted to pivot about at least one axis on the support by means of at least one pivot link between the light module and the support, said pivot link comprising a threaded rod and an elastically deformable element arranged to allow a pivoting of the light module in relation to the support about said axis;
at least one setting means for the light module arranged to allow a pivoting of the light module in relation to the support about said axis when the setting means is actuated; and a constraint means arranged to hold the light module in position in relation to the support in the absence of actuation of the setting means, wherein the elastically deformable element is disposed around the threaded rod and is compressed by the pivoting of the light module.

2. The light device according to claim 1, wherein the pivot link further comprises a locking nut.

3. The light device according to claim 2, wherein the elastically deformable element is adapted to absorb the angular variations of the light module during the setting of the position of said light module by the setting means.

4. The light device according to claim 2, wherein said light device comprises a setting means for a vertical setting of the light module and a setting means for a horizontal setting of said light module.

5. The light device according to claim 2, wherein the constraint means is independent of the setting means.

6. The light device according to claim 2, wherein the constraint means is incorporated in the setting means.

7. The light device according to claim 1, wherein the elastically deformable element is adapted to absorb the angular variations of the light module during the setting of the position of said light module by the setting means.

8. The light device according to claim 1, wherein said light device comprises a setting means for a vertical setting of the light module and a setting means for a horizontal setting of said light module.

9. The light device according to claim 1, wherein the constraint means is independent of the setting means.

10. The light device according to claim 9, wherein the setting means comprises a contact end with the support, said contact end having no sharp edge.

11. The light device according to claim 10, wherein the constraint means is a spring.

12. The light device according to claim 9, wherein the constraint means is a spring.

13. The light device according to claim 1, wherein the constraint means is incorporated in the setting means.

14. The light device according to claim 13, wherein the constraint means is a spring.

15. The light device according to claim 13, wherein the setting means is secured to the support.

16. The light device according to claim 15, wherein the setting means comprises a threaded rod and a screw pitch.

17. The light device according to claim 13, wherein the setting means is secured to the light module.

18. The light device according to claim 17, wherein the setting means comprises a threaded rod and a nut.

19. The light device according to claim 1, wherein said light device comprises a plurality of light modules and is adapted to produce a segmented light beam made up of several light segments, that can be activated selectively, one light segment being generated by one light module.

20. A light device for a motor vehicle comprising:

a support;

at least one light module, said light module being mounted to pivot about at least one axis on the support by means of at least one pivot link between the light module and the support, said pivot link comprising an elastically deformable element arranged to allow a pivoting of the light module in relation to the support about said axis;

at least one setting means for the light module arranged to allow a pivoting of the light module in relation to the support about said axis when the setting means is actuated; and a constraint means arranged to hold the light module in position in relation to the support in the absence of actuation of the setting means, wherein said light device comprises a light module, called reference module, said reference module being mounted on the support by means of three pivot links, said at least one pivotingly mounted light module being set on the support in relation to said reference module.

* * * * *